(12) United States Patent
Toy

(10) Patent No.: US 10,187,711 B2
(45) Date of Patent: Jan. 22, 2019

(54) TIME ALLOCATION FOR NETWORK TRANSMISSION

(71) Applicant: Comcast Cable Communications, LLC, Philadelphia, PA (US)

(72) Inventor: Mehmet Toy, Allendale, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 410 days.

(21) Appl. No.: 14/821,014

(22) Filed: Aug. 7, 2015

(65) Prior Publication Data

US 2017/0041248 A1 Feb. 9, 2017

(51) Int. Cl.
*H04Q 11/00* (2006.01)
*H04L 12/841* (2013.01)

(52) U.S. Cl.
CPC ........ *H04Q 11/0067* (2013.01); *H04L 47/28* (2013.01); *H04Q 2011/0064* (2013.01); *H04Q 2011/0086* (2013.01)

(58) Field of Classification Search
CPC .......... H04Q 11/0067; H04Q 11/0001; H04Q 11/0066; H04Q 2011/0086; H04L 47/28; H04L 47/10
USPC ................................................ 370/252, 235
See application file for complete search history.

(56) References Cited

U.S. PATENT DOCUMENTS

| | | | |
|---|---|---|---|
| 7,734,176 B2 | 6/2010 | Mishra et al. | |
| 9,215,181 B2 | 12/2015 | Toy | |
| 2013/0039182 A1* | 2/2013 | Das | H04L 41/0816 370/235 |
| 2014/0169192 A1* | 6/2014 | Zhang | H04W 24/08 370/252 |
| 2014/0294388 A1* | 10/2014 | Odaka | H04B 10/27 398/66 |

OTHER PUBLICATIONS

Bhagat, A.M., GPON Fundamentals. Knowledge Base. Retrieved from the Internet: https://sites.google.com/site/amitsciscozone/gpon-fundamentals. <retrieved on Jun. 21, 2008> (12 pages).
Bhagat, A.M., GPON: VLANs and GEM Ports. Knowledge Base. Retrieved from the Internet: https://sites.google.com/site/amitsciscozone/home/gpon/gpon-vlans-and-gem-ports. <retrieved on Jun. 27, 2018> (10 pages).
Gaglianello, B., Logical MACs, LLIDs and EPONs. IEEE. Retrieved from the Internet: http://www.ieee802.org/3/efm/public/jul02/p2mp/gaglianello_p2mp_1_0702.pdf. <retrieved on Jun. 27, 2018> (8 pages).

(Continued)

*Primary Examiner* — Kwang B Yao
*Assistant Examiner* — Syed M Bokhari
(74) *Attorney, Agent, or Firm* — Ballard Spahr LLP

(57) ABSTRACT

Methods and systems for managing data transmissions are disclosed. An example method can comprise determining a plurality of time allocations for a time cycle. The plurality of time allocations can comprise a first time allocation which can be determined based on an information rate, a committed information rate, an excess information rate, an effective bandwidth rate, other factors, or a combination thereof. Data can be received from multiple sources into a buffer, for example, and can be processed within a time cycle if processing the data will not exceed the time allocation.

20 Claims, 8 Drawing Sheets

(56) References Cited

OTHER PUBLICATIONS

Heinanen, J. et al., A Two Rate Three Color Marker. Network Working Group. University of Pennsylvania. Sep. 1999 (5 pages).
Kim, H. et al., Sliding Cycle Time-based MAC Protocol for Service Level Agreeable Ethernet Passive Optical Networks. IEEE International Conference on Communications, 2005 (5 pages).
Ma, M. et al., A Bandwidth Guaranteed Polling MAC Protocol for Ethernet passive optical networks. IEEE. 2003 (3 pages).
Tech Library, Understanding Port Shaping and Queue Shaping for CoS on EX Series Switches. Juniper Networks. Retrieved from the Internet: https://www.juniper.net/documentation/en_US/junos12.2/topics/concept/cos-shaping-ex-series-understanding.html. <retrieved on Jun. 27, 2018> Jun. 21, 2012 (1 page).

\* cited by examiner

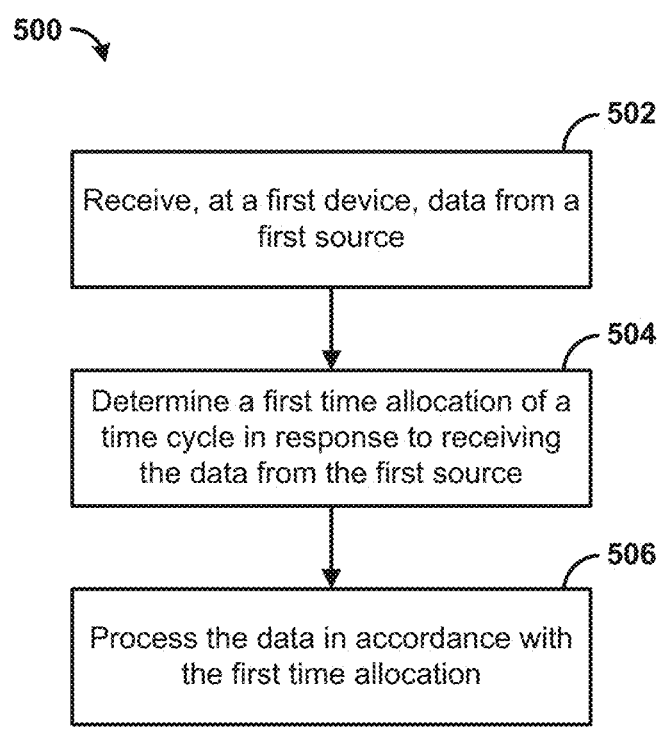

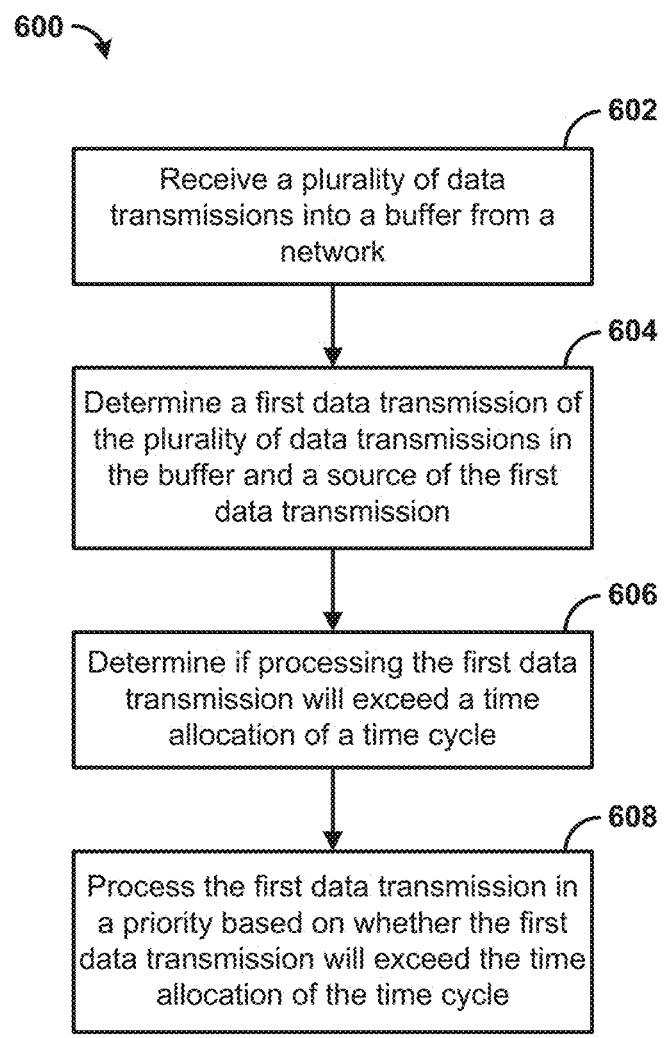

TIME ALLOCATION FOR NETWORK TRANSMISSION

BACKGROUND

In a point-to-multipoint network, such as a passive optical network, data transmissions from downstream devices are typically coordinated by sending grant messages to give permission to the downstream devices to send data over a shared communication medium. Such messaging procedures, and other existing network management techniques, use bandwidth and processing resources. As the number of downstream devices sharing the communication medium increase, these messaging procedures become inefficient. Thus, there is a need for more sophisticated methods and systems for managing data transmissions.

SUMMARY

It is to be understood that both the following general description and the following detailed description are exemplary and explanatory only and are not restrictive. Provided are methods and systems for managing data transmissions. For example, the present methods and systems can be implemented in a network having a shared resource. The network can comprise a point-to-multipoint network, such as a passive optical network.

In some aspects, a single network device can receive data transmissions from a plurality of sources. To efficiently manage processing (e.g., routing, forwarding, transmitting, analyzing) of these data transmissions, the network device can determine (e.g., access, assign, allocate) one or more time allocations (e.g., of a time cycle) for the source in the network based on information rates associated with the source. Information rates can comprise, for example, committed information rates, excess information rates, effective bandwidth rates, and/or the like. Information rates can be disclosed in and/or derived from a subscription level agreement between a service provider and a customer associated with the source.

The time cycle can be divided into a plurality of time allocations. Each of the plurality of time allocations can represent a maximum amount of time to dedicate resources (e.g., processing time, bandwidth, transmission time) to a corresponding source (e.g., a device, a network connection, a network flow, a channel, a port).

Additional advantages will be set forth in part in the description which follows or may be learned by practice. The advantages will be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 5 is a flowchart illustrating an example method;
FIG. 6 is a flowchart illustrating another example method.

DETAILED DESCRIPTION

Figure 1:
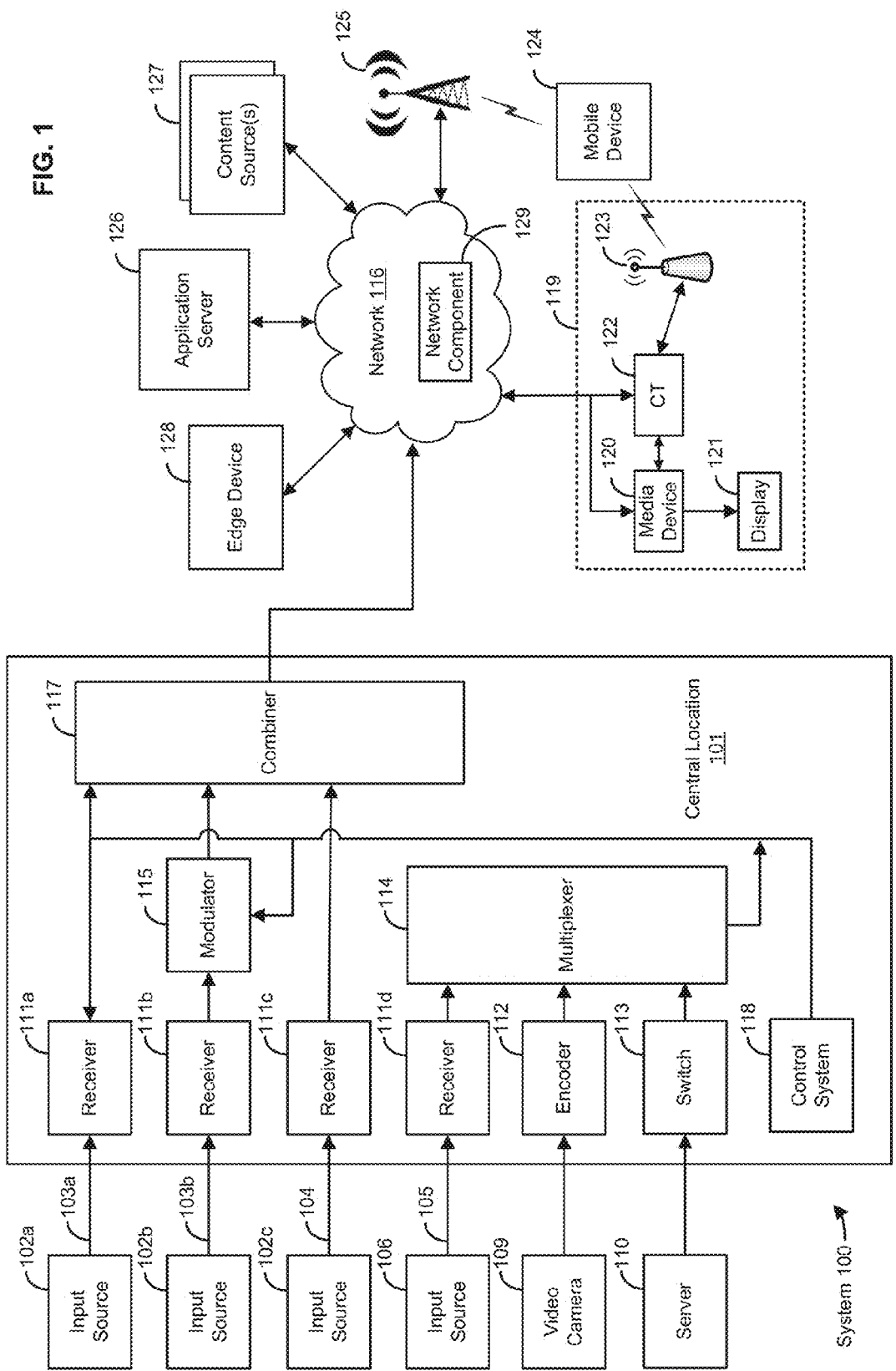
FIG. 1 is a block diagram illustrating an example system.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium.

More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The present disclosure relates to managing data transmissions. In an aspect, a network device (e.g., optical line terminal) can be configured to manage a shared network resource (e.g., bandwidth in a point-to-multipoint network) by determining (e.g., assigning, allocating, accessing) a plurality of time allocations for a time cycle. Each of the plurality of time allocations can represent a maximum amount of time to dedicate resources (e.g., processing time, bandwidth, transmission time) to a corresponding source (e.g., a device, a network connection, a network flow, a channel, a port). For example, the network device can be located in a network that splits a physical network channel into one or more branches leading to a plurality of sources. The sources can be network devices (e.g., optical network units), network connections that may comprise multiple flows (e.g., data streams, queues, channels, ports) of the network devices, and/or the like. The plurality of sources can transmit data to the network device asynchronously. The transmitted data can comprise multiple data units, such as packets, frames, blocks, segments, and/or the like. The network device can receive the transmitted data and, at least temporarily, store the data in a buffer. The network device can process the data in the buffer according to a time allocation associated with the source of the data. For example, if processing part of the data (e.g., or at least a portion of the data) would result in exceeding the time allocation, then the network device can delay processing a data unit until the next time cycle.

In an aspect, the plurality of sources (e.g., or the devices comprising the sources) can be configured to determine if sending a data transmission will result in exceeding a time allocation. For example, the time allocations can be provided to the plurality of sources or otherwise determined (e.g., calculated) by the plurality of sources. The plurality of sources can delay sending data until a subsequent time cycle if it is determined that sending the data will exceed the time allocation.

FIG. 1 illustrates various aspects of an exemplary system in which the present methods and systems can operate. Those skilled in the art will appreciate that present methods may be used in systems that employ both digital and analog equipment. One skilled in the art will appreciate that provided herein is a functional description and that the respective functions can be performed by software, hardware, or a combination of software and hardware.

A system 100 can comprise a central location 101 (e.g., a headend), which can receive content (e.g., data, input programming, and the like) from multiple sources. The central location 101 can combine the content from the various sources and can distribute the content to user (e.g., subscriber) locations (e.g., location 119) via a distribution system 116.

In an aspect, the central location 101 can receive content from a variety of sources 102a, 102b, 102c. The content can be transmitted from the source to the central location 101 via a variety of transmission paths, including wireless (e.g. satellite paths 103a, 103b) and a terrestrial path 104. The central location 101 can also receive content from a direct feed source 106 via a direct line 105. Other input sources can comprise capture devices such as a video camera 109 or a server 110. The signals provided by the content sources can include a single content item or a multiplex that includes several content items.

The central location 101 can comprise one or a plurality of receivers 111a, 111b, 111c, 111d that are each associated with an input source. For example, MPEG encoders such as an encoder 112, are included for encoding local content or a video camera 109 feed. A switch 113 can provide access to the server 110, which can be a Pay-Per-View server, a data server, an internet router, a network system, a phone system, and the like. Some signals may require additional processing, such as signal multiplexing, prior to being modulated. Such multiplexing can be performed by a multiplexer (mux) 114.

The central location 101 can comprise one or a plurality of modulators 115 for interfacing to a network 116. The modulators 115 can convert the received content into a modulated output signal suitable for transmission over a network 116. The output signals from the modulators 115 can be combined, using equipment such as a combiner 117, for input into the network 116. In an aspect, the network 116 can comprise a content delivery network, a content access network, and/or the like. For example, the network 116 can be configured to provide content from a variety of sources using a variety of network paths, protocols, devices, and/or the like. The content delivery network and/or content access network can be managed (e.g., deployed, serviced) by a content provider, a service provider, and/or the like.

A control system 118 can permit a system operator to control and monitor the functions and performance of the system 100. The control system 118 can interface, monitor, and/or control a variety of functions, including, but not limited to, the channel lineup for the television system, billing for each user, conditional access for content distributed to users, and the like. The control system 118 can provide input to the modulators for setting operating parameters, such as system specific MPEG table packet organization or conditional access information. The control system 118 can be located at the central location 101 or at a remote location.

The network 116 can distribute signals from the central location 101 to user locations, such as a user location 119. The network 116 can comprise an optical fiber network, a coaxial cable network, a hybrid fiber-coaxial network, a wireless network, a satellite system, a direct broadcast system, an Ethernet network, a high-definition multimedia interface network, universal serial bus network, or any combination thereof.

In an aspect, a multitude of users can be connected to the network 116 at one or more of the user locations. At the user location 119, a media device 120 can demodulate and/or decode, if needed, the signals for display on a display device 121, such as on a television set (TV) or a computer monitor. For example, the media device 120 can comprise a demodulator, decoder, frequency tuner, and/or the like. The media device 120 can be directly connected to the network (e.g., for communications via in-band and/or out-of-band signals of a content delivery network) and/or connected to the network 116 via a communication terminal 122 (e.g., for communications via a packet switched network). The media device 120 can comprise a set-top box, a digital streaming device, a gaming device, a media storage device, a digital recording device, a combination thereof, and/or the like. The media device 120 can comprise one or more applications, such as content viewers, social media applications, news applications, gaming applications, content stores, electronic program guides, and/or the like. Those skilled in the art will appreciate that the signal can be demodulated and/or decoded in a variety of equipment, including the communication terminal 122, a computer, a TV, a monitor, or satellite dish.

In an aspect, the communication terminal 122 can be located at the user location 119. The communication terminal 122 can be configured to communicate with the network 116. The communications terminal 122 can comprise a modem (e.g., cable modem), a router, a gateway, a switch, a network terminal (e.g., optical network unit), and/or the like. The communications terminal 122 can be configured for communication with the network 116 via a variety of protocols, such as internet protocol, transmission control protocol, file transfer protocol, session initiation protocol, voice over internet protocol, and/or the like. For example, for a cable network, the communication terminal 122 can be configured to provide network access via a variety of communication protocols and standards, such as Data Over Cable Service Interface Specification.

In an aspect, the user location 119 can comprise a first access point 123, such as a wireless access point. The first access point 123 can be configured to provide one or more wireless networks in at least a portion of the user location 119. The first access point 123 can be configured to provide access to the network 116 to devices configured with a compatible wireless radio, such as a mobile device 124, the media device 120, the display device 121, or other computing devices (e.g., laptops, sensor devices, security devices). For example, the first access point 123 can provide a user managed network (e.g., local area network), a service provider managed network (e.g., public network for users of the service provider), and/or the like. It should be noted that in some configurations, some or all of the first access point 123, the communication terminal 122, the media device 120, and the display device 121 can be implemented as a single device.

In an aspect, the user location 119 may not be fixed. By way of example, a user can receive content from the network 116 on the mobile device 124. The mobile device 124 can comprise a laptop computer, a tablet device, a computer station, a personal data assistant (PDA), a smart device (e.g., smart phone, smart apparel, smart watch, smart glasses), GPS, a vehicle entertainment system, a portable media player, a combination thereof, and/or the like. The mobile device 124 can communicate with a variety of access points (e.g., at different times and locations or simultaneously if within range of multiple access points). For example, the mobile device 124 can communicate with a second access point 125. The second access point 125 can be a cell tower, a wireless hotspot, another mobile device, and/or other remote access point. The second access point 125 can be within range of the user location 119 or remote from the user location 119. For example, the second access point 125 can be located along a travel route, within a business or residence, or other useful locations (e.g., travel stop, city center, park).

In an aspect, the system 100 can comprise an application device 126. The application device 126 can be a computing device, such as a server. The application device 126 can provide services related to applications. For example, the application device 126 can comprise an application store. The application store can be configured to allow users to purchase, download, install, upgrade, and/or otherwise manage applications. For example, the application device 126 can be configured to allow users to download applications to a device, such as the mobile device 124, communications terminal 122, the media device 120, the display device 121, and/or the like. The application device 126 can run one or more application services to provide data, handle requests, and/or otherwise facilitate operation of applications for the user.

In an aspect, the system 100 can comprise one or more content source(s) 127. The content source(s) 127 can be configured to provide content (e.g., video, audio, games, applications, data) to the user. The content source(s) 127 can be configured to provide streaming media, such as on-demand content (e.g., video on-demand), content recordings, and/or the like. For example, the content source(s) 127 can be managed by third party content providers, service providers, online content providers, over-the-top content providers, and/or the like. The content can be provided via a subscription, by individual item purchase or rental, and/or the like. The content source(s) 127 can be configured to provide the content via a packet switched network path, such as via an internet protocol (IP) based connection. In an aspect, the content can be accessed by users via applications, such as mobile applications, television applications, set-top box applications, gaming device applications, and/or the like. An example application can be a custom application (e.g., by content provider, for a specific device), a general content browser (e.g., web browser), an electronic program guide, and/or the like.

In an aspect, the system 100 can comprise an edge device 128. The edge device 128 can be configured to provide content, services, and/or the like to the user location 119. For example, the edge device 128 can be one of a plurality of edge devices distributed across the network 116. The edge device 128 can be located in a region proximate to the user location 119. A request for content from the user can be directed to the edge device 128 (e.g., due to the location of the edge device and/or network conditions). The edge device 128 can be configured to package content for delivery to the user (e.g., in a specific format requested by a user device), provide the user a manifest file (e.g., or other index file describing segments of the content), provide streaming content (e.g., unicast, multicast), provide a file transfer, and/or the like. The edge device 128 can cache or otherwise store content (e.g., frequently requested content) to enable faster delivery of content to users.

In an exemplary embodiment, the methods and systems disclosed can be located within the network 116. For example, the network 116 can comprise a network component 129, such as a network endpoint. The network component 129 can be configured to terminate a portion of the network 116. For example, the network component 129 can be configured to manage a shared network resource, such as an optical network. The network component 129 can be an endpoint for a passive optical network. The passive optical network can transmit data via optical fiber to a plurality of the user locations 119. For example, the optical fiber can be split into a plurality of branches for communication to the plurality of user locations. The network component 129 can be configured to manage the shared network resource by determining (e.g., assigning, allocating, accessing) a plurality of time allocations for a time cycle. A time cycle can be a period of time (e.g., a repeating period of time) used for organizing, prioritizing, processing and/or the like. Each of the plurality of time allocations can represent a maximum amount of time to dedicate resources (e.g., processing time, bandwidth, transmission time) to a corresponding source (e.g., a device, a network connection, a network flow, a channel, a port). Specific time allocations of the plurality of time allocations can be associated with (e.g., assigned to, allocated to) corresponding sources. For example, a data store can be maintained (e.g., at the network component 129) that stores associations between time allocations, sources, users, service level agreements, and/or the like. The time allocations can be associated with the sources in order to ensure that users (e.g., using the sources) obtain at least a specified amount of access, bandwidth, and/or the like of the network 116. The plurality of time allocations can represent (e.g., individually) a maximum amount of time for processing data from a particular source during the time cycle. For example, the network component 129 can comprise the first device 204 of FIG. 2.

Figure 2:
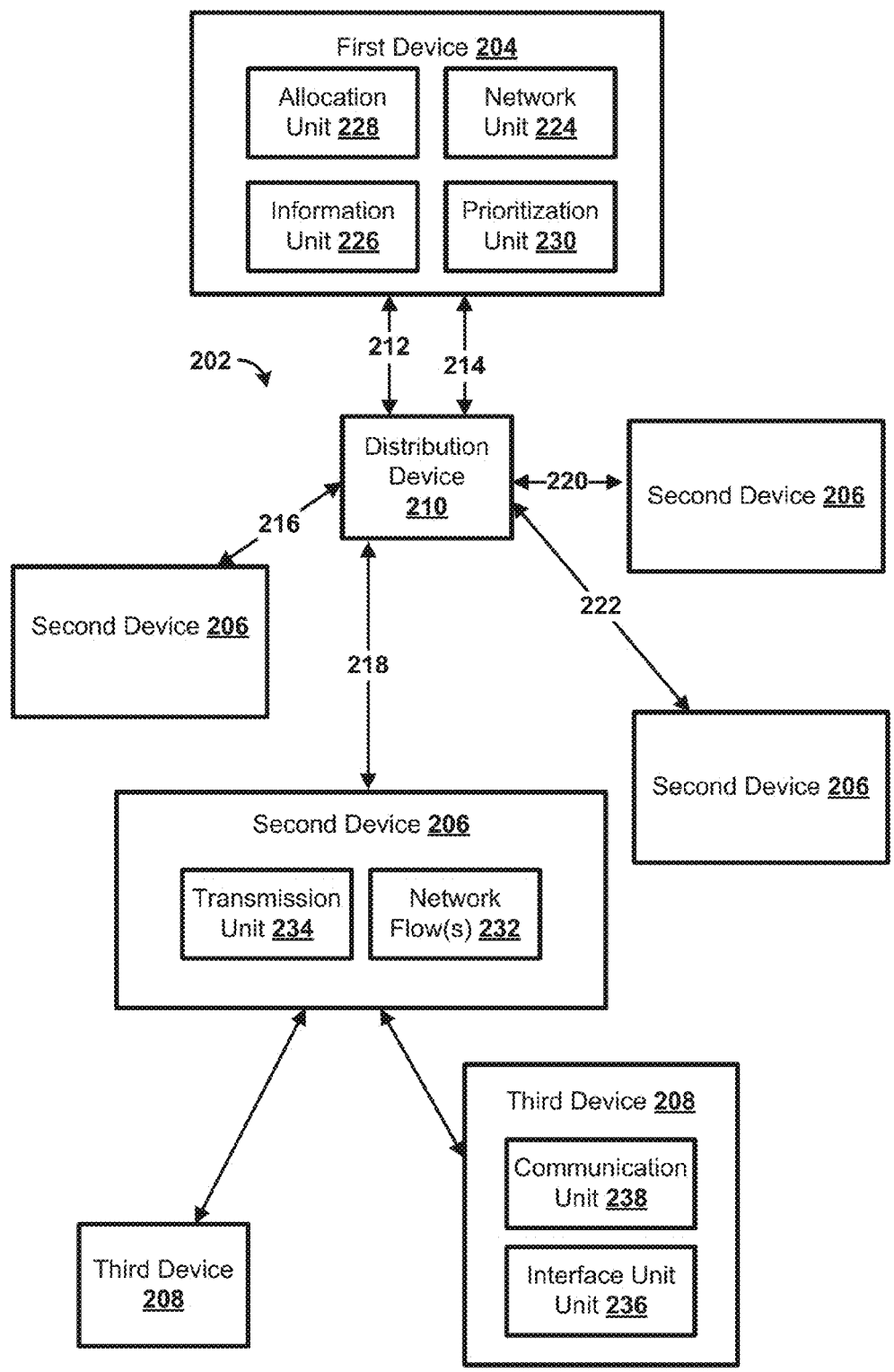
FIG. 2 is a block diagram illustrating an another example system.

FIG. 2 is a block diagram illustrating an example system 200 for data transmission. In one aspect, the system 200 can comprise a network 202. The network 202 can comprise a packet switched network (e.g., internet protocol based network), a non-packet switched network (e.g., quadrature amplitude modulation based network), and/or the like. In an aspect, the network 202 can be configured to implement cloud applications (e.g., applications remotely accessible from a variety of devices), software defined networking applications, and/or the like. The network 202 can comprise network adapters, switches, routers, modems, and the like connected through wireless links (e.g., radio frequency, satellite) and/or physical links (e.g., fiber optic cable links, coaxial cable links, Ethernet cable links, or a combination thereof). The network 202 can comprise public networks, private networks, wide area networks (e.g., Internet), local area networks, and/or the like. The network 202 can comprise a content access network, a content distribution network, and/or the like. In one aspect, the network 202 can be configured to provide communication from a telephone, a cellular device, a modem, and/or other electronic devices to and throughout the system 200. For example, the network 202 can be configured to communicatively couple one or more of a first device 204, a plurality of second devices 206, a plurality of third devices 208, and/or the like.

In an aspect, the network 202 can be configured as an optical network, such as an active optical network, a passive optical network, and/or the like. For example, the first device 204 can comprise an optical line terminal. The plurality of second devices 206 can comprise optical network units configured to communicate with the optical line terminal. In an aspect, the network 202 can be configured as an Ethernet passive optical network (EPON), Gigabit Passive Optical Network (GPON), Data Over Cable Service Interface Specification (DOCSIS®) Provisioning of EPON (DPoE), and/or any other suitable network, such as a network employing TDM (Time Division Multiplexing), packet multiplexing technologies, a combination of TDM and packet multiplexing, and/or the like. For example, the network 202 can be configured to transmit data via Internet Protocol (IP) packets, Ethernet frames, and/or the like.

In an aspect, the network 202 can comprise a point-to-multipoint network. For example, the network 202 can comprise a distribution device 210 configured to deliver, receive, direct, and/or the like information and/or signals to and from a plurality of devices (e.g., the plurality of second devices 206, the plurality of third devices 208). The distribution device 210 can comprise active components, such as a powered computing device and/or a passive components, which may operate without power. The distribution device 210 can comprise a splitter, such as a beam splitter. The distribution device 210 can be configured to split one or more network paths into multiple network branches. For example, the distribution device 210 can comprise one or more input ports. The distribution device 210 can comprise multiple output ports. The input port can comprise, carry, convey, channel, route, and/or the like one or more network paths (e.g., and/or network flows). Each of the one or more network paths can comprise one or more optical fibers. For example, the network 202 can comprise a first network path 212 and a second network path 214. The distribution device 210 can split the first network path 212 into a first network branch 216 and a second network branch 218. The distribution device 210 can split the second network path 214 into a third network branch 220 and a fourth network branch 222. It should be understood that the distribution device 210 can be configured split a network path into more than two network branches. In an aspect, the first network path 212 can be configured to transmit data at a first bit rate. The second network path 214 can be configured to transmit data at a second bit rate. The first bit rate can be different (e.g., lower, higher) than the second bit rate. As an illustration, the first bit rate can comprise 1 Gigabit per second (Gbps), and the second bit rate can comprise 10 Gbps. It should be noted that the one or more network paths can be configured to receive and/or transmit data at any other appropriate bit rate.

The system 200 can comprise a first device 204. The first device 204 can be a server for communicating with the plurality of second devices 206 and/or the plurality of third devices 208. As an example, the first device 204 can communicate with the second device 206 for providing data and/or services. As an example, the first device 204 can provide services such as network (e.g., Internet) connectivity, network printing, media management (e.g., media server), data (e.g., content) services, streaming services, broadband services, or other network-related services. In an aspect, the first device 204 can allow the plurality of second devices 206 and/or the plurality of third devices 208 to interact with remote resources, such as data, devices, files, and/or the like. As an example, the first device 204 can be configured as (or disposed at) a central location (e.g., a headend, or processing facility), which can receive data (e.g., content, input programming) from multiple sources. The first device 204 can combine the data from the multiple sources and can distribute the data to user (e.g., subscriber) locations via a distribution system of the network 202.

In an aspect, the first device 204 can be configured to receive, transmit, process, and/or the like data, such as data transmissions. For example, the data can be received, transmitted, and/or the like as data packets, such as layer 2 packets (e.g., Ethernet frames), layer 3 packets (e.g., internet protocol packet, and/or the like), and/or the like. The data can comprise text, audio, video, and/or the like.

In an aspect, the first device 204 can comprise a network unit 224 configured to transmit and/or receive data via the network 202. The network unit 224 can comprise a plurality of network ports. As an example, the network unit 224 can comprise one or more line cards comprising at least a portion of the plurality of network ports. For example, the plurality of network ports can comprise network ports configured for receiving and/or transmitting data at a variety of bit rates. For example, the plurality of network ports can comprise a first port configured to receive and/or transmit data at a first bit rate. The plurality of network ports can comprise a second port configured to receive and/or transmit data at a second bit rate. The first bit rate can be different (e.g., lower, higher) than the second bit rate. As an illustration, the first bit rate can comprise 1 Gigabit per second (Gbps), and the second bit rate can comprise 10 Gbps. It should be noted that a plurality of ports 304, illustrated in FIG. 3, can be configured to receive and/or transmit data at any other appropriate bit rate.

In an aspect, the first device 204 can comprise an information unit 226 configured to provide subscriber information. Subscriber information can comprise terms, details, rates, and/or details of agreements between a service provider and one or more (or each) of a plurality users (e.g., subscribers). For example, the agreements can comprise subscription level agreements that specify user rights, bit rate commitments, and/or the like. The subscriber information can comprise committed information rates (CIR). The committed information rates can be associated with corresponding users. The committed information rates can comprise a minimum bandwidth, a minimum bit rate, and/or the like that the service provider has agreed to provide a corresponding user (e.g., or otherwise associated with the corresponding user). The subscriber information can comprise excess information rates (EIR). The excess information rates can be associated with corresponding users. The excess information rates can comprise a maximum bandwidth, a maximum bit rate, and/or the like that the service provider has associated with the corresponding users (e.g., or agreed to provide corresponding users). The CIRs and/or EIRs can be associated with specific time periods, conditions, and/or the like. For example, the agreements can specify that a corresponding CIR and/or EIR is valid during certain times of a day, for a certain period of time (e.g., while the agreement is valid), while certain conditions are met, and/or the like. In an aspect, many of the users can enter into agreements with similar terms and thus be associated with the same CIR and/or the same EIR. For example, in a 1 G network port, one user may choose to have CIR=10 Mbps and EIR=5 Mbps while another user may choose to have CIR=500 Mbps and EIR=100 Mbps.

In an aspect, the subscriber information can comprise an effective bandwidth rate. The effective bandwidth rate can be based on a combination of the committed information rate and the excess information rate. In an aspect, the effective bandwidth rate for a given network flow can be calculated as $$BWEF^{NF}=\max(CIR, PR/(1+(\max(jitter_{A\text{-}Z}, jitter_{Z\text{-}A})*PR)/MBS),$$

where PR=CIR+EIR.

This equation can be valid for network flows, such as an Ethernet Virtual Connection (EVC) or an IP flow with no loss SLAs (service level agreements). In an aspect, the effective bandwidth for a given network flow (or EVCs or CoS) with loss SLAs, can be calculated as:

$$BWEF^{NF}=\max(CIR, PR*\alpha)$$

where $\alpha=[(\beta-b)+\sqrt{(\beta-b)^2+4(CIR/PR)\beta*b}]/2\beta$, where $\beta=(\ln 1/FLR)(MBS/CIR)(1-CIR/PR)PR$, and where Jitter$_{A\text{-}Z}$ is a delay variation between a pair of packets of a given connection or network flow travelling from end point A of the connection or flow to the end point Z of the connection or flow. Jitter$_{Z\text{-}A}$ is the delay variation between a pair of packets of a given connection or flow travelling from the end point Z of the connection or flow to the end point A of the connection or flow. PR is the peak rate and can be defined by a port rate or EIR+CIR for a given connection or flow. FLR is the frame loss ratio and can be defined by ((the number of frames transmitted minus the number of frames received)/(number of frames transmitted)) in a given connection or flow. Maximum Burst Size (MBS) is the maximum output burst of a shaper or policer associated with the PR. The effective bandwidth rate is described in further detail in U.S. patent application Ser. No. 13/669,742 filed Nov. 6, 2012, herein incorporated by reference in its entirety.

In an aspect, the first device 204 can comprise an allocation unit 228 configured to determine a plurality of time allocations for a time cycle. The time cycle can be a time cycle for processing data transmissions from a plurality of sources. For example, the time cycle can comprise a period of time (e.g., a repeating period of time) for organizing, prioritizing, processing, and/or the like (e.g., of data or data transmissions). Each time allocation of the plurality of time allocations can comprise a time duration representing a maximum amount of time for processing data from a corresponding source during the time cycle. As explained further herein, the first device 204 can delay (e.g., until a subsequent time cycle) processing data transmissions if a time allocation is exceeded and/or if processing a data transmission will result in exceeding a time allocation.

In an aspect, the plurality of time allocations can be determined for a plurality of sources (e.g., network sources). Example sources of the plurality of sources can comprise devices (e.g., the plurality of second devices 206, the plurality of third devices 208), network flows of the devices, network ports (e.g., of the first device 204), and/or the like. For example, one or more (or each) of the plurality of second devices can organize data (e.g., data packets, data transmissions) into one or more network flows (e.g., channel, queue, port) for transmission of the data via the network 202. As explained further herein, the one or more network flows can be associated with and/or receive data for particular users, data types, devices, applications, and/or the like.

In an aspect, the allocation unit 228 can be configured to determine (e.g., allocate, define, specify) time allocations based on one or more rates, such as the committed information rates, the excess information rates, the effective bandwidth rates, and/or the like. For example, a first time allocation for a first user can be determined based on a first committed information rate, a first excess information rates, a first effective bandwidth rate, and/or the like associated with a first user. For example, a second time allocation for a second user can be determined based on a second committed information rate, a second excess information rate, a second effective bandwidth rate, and/or the like associated with a second user.

In an aspect, the allocation unit 228 can be configured to determine the plurality of time allocations for a time cycle for managing a plurality of ports with a variety of bit rates. For example, the allocation unit 228 can be configured to determine a first plurality of time allocations for ports with a first bit rate (e.g., 1 Gbps). The allocation unit 228 can be configured to determine a second plurality of time allocations for ports with a second bit rate (e.g., 10 Gbps). The first plurality of time allocations and the second plurality of time allocation can both be time allocations of the same time cycle. In an aspect, the allocation unit 228 can be configured to determine time allocations based on one or more bit rates. For example, longer or shorter time allocations can be determined depending on the bit rate. As another example, more time allocations can be granted for ports having a higher bit rate than for ports having a lower bit rate.

Figure 3:
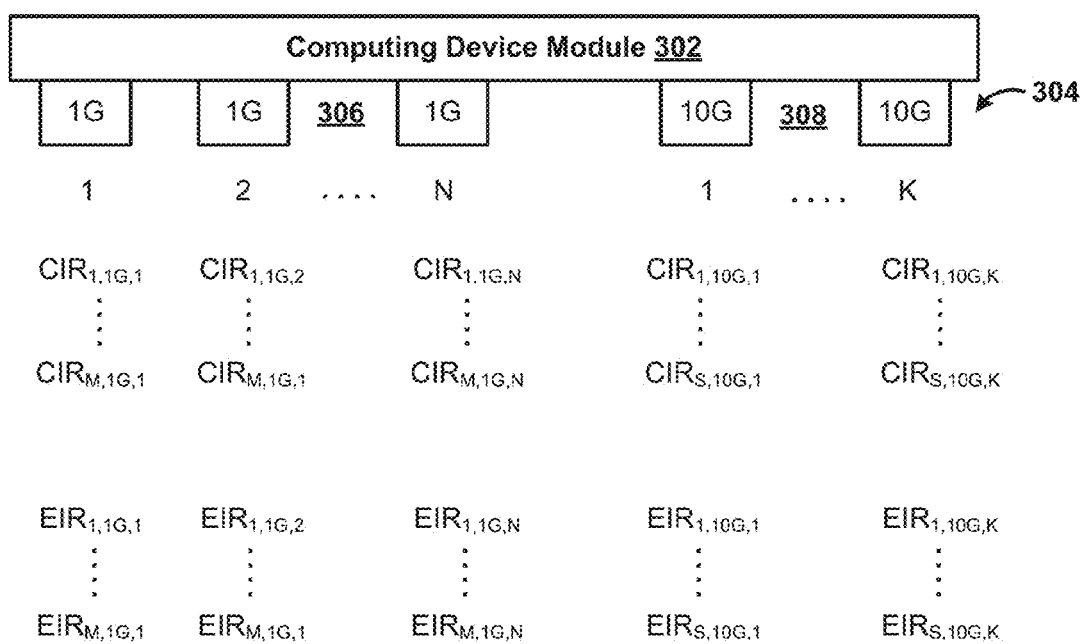
FIG. 3 is a diagram illustrating example time allocations.

As an illustration, the time allocations can be determined for a system having ports with different bit rates based on the following examples. For purposes of illustration, port rates of 1 Gbps (1 G) and 10 Gbps (10 G) are used for the following examples, but it should be appreciated that other port rates (e.g., 40 G, 100 G) can be used. This illustration can comprise a plurality of 1 G ports and a plurality of 10 G ports as shown in FIG. 3. For example, if 1 G and 10 G traffic are in the same priority, time allocations for a 1 G port can be defined as $t_{1G}=(T/[(N\times 1)+(K\times 10)])$, where T is the total scheduling time of the time cycle, N is the number of 1 G ports, and K is the number of 10 G ports. Time allocations for a 10 G port can be defined as $t_{10G}=((T\times 10)/[(N\times 1)+(K\times 10)])$.

In some implementations, the time allocations can be determined based on only committed information rates. In such case, the time allocation for network flow i in 1 G port j, at the $n^{th}$ grant time can be defined as $t_{i,1G,j}^{n}=(t_{1G}\times CIR_{i,1G,j})/(\Sigma_{i=1}^{M}CIR_{i,1G,j})$. The time allocation for network flow i in 10 G port j can be defined as $t_{i,10G,j}^{n}=(t_{10G}\times CIR_{i,10G,j})/(\Sigma_{j=1}^{S}CIR_{i,10G,j})$.

In an aspect, the time allocations can be determined based on both committed information rates and excess information rates. In an aspect, a time cycle T can represent a total scheduling time. T can be defined as $T=T_{fixed}+T_{excess}$ where $T_{fixed}$ represents time allocated based on committed information rates and $T_{excess}$ represents time allocated based on excess information rates. If 1 G and 10 G data traffic are given the same priority, then the total time allocation for 1 G ports based on committed information rate can be defined as $t_{1G,fixed}=(T_{fixed}/[(N\times 1)+(K\times 10)])$. The total time allocation for a 10 G port fixed rate can be defined as $t_{10G,fixed}=((T_{fixed}\times 10)/[(N\times 1)+(K\times 10)])$. The total time allocation for a 1 G port based on excess rate can be defined as $t_{1G,excess}=(T_{excess}/[(N\times 1)+(K\times 10)])$. The total time allocation for 10 G ports based on excess rate can comprise $t_{10G,fixed}=((T_{excess}\times 10)/[(N\times 1)+(K\times 10)])$. Time allocations based on CIR for 1 G ports can be defined as:

$$t_{i,1G,j,fixed}^{n}=(t_{1G,fixed}\times CIR_{i,1G,j})/(\Sigma_{i=1}^{S}CIR_{i,1G,j})$$

Time allocations based on CIR for 10 G ports can be defined as:

$$t_{i,10G,j,fixed}^{n}=(t_{10G,fixed}\times CIR_{i,10G,j})/(\Sigma_{i=1}^{S}CIR_{i,10G,j})$$

Time allocations based on EIR for 1 G ports can be defined as:

$$t_{i,1G,j,excess}^{n}=(t_{1G,excess}\times EIR_{i,1G,j})/\left(\sum_{i=1}^{M}EIR_{i,1G,j}\right)$$

Time allocations based on EIR for 10 G ports can be defined as:

$$t_{i,10G,j,excess}^{n}=(t_{10G,excess}\times EIR_{i,10G,j})/\left(\sum_{i=1}^{S}EIR_{i,10G,j}\right)$$

The previous equations can be generalized as follows. An example time cycle, T, can be defined for a given port (e.g., port of an optical line terminal) as $T=t_{fixed}+t_{excess}$. The time allocation (e.g., the $n^{th}$ time slot or time duration, $t^n$) for $i^{th}$ network flow in $j^{th}$ network device (e.g., second device 206, optical network unit) based on committed information rate can be defined as $t_{i,j,fixed}^{n}=(t_{fixed}\times CIR_{i,j})/(\Sigma_{i=1}^{M}CIR_{i,j})$. The time allocation (e.g., the $n^{th}$ time slot or time duration, $t^n$) for the $i^{th}$ network flow in $j^{th}$ network device (e.g., second device 206, optical network unit) based on excess information rate can be defined $t_{i,j,excess}^{n}=(t_{excess}\times EIR_{i,j})/(\Sigma_{i=1}^{M}EIR_{i,j})$.

As a further illustration, the time allocations can be allocated based on effective bandwidth. For example, the time allocations can be allocated to multiple ports of different bit rates based on effective bandwidth. If 1 G and 10 G traffic are given the same priority, then the total time allocated for 1 G ports can be defined as $t_{1G}=(T/[(N\times 1)+(K\times 10)])$. The total time allocated for 10 G port can be defined as $t_{10G}=((T\times 10)/[(N\times 1)+(K\times 10)])$. Time allocations based on effective bandwidth (EBW) for 1 G ports can be defined as:

$$t_{i,1G,j}^{n}=(t_{1G}\times EBW_{i,1G,j})/\left(\sum_{i=1,j=1}^{M}EBW_{i,1G,j}\right)$$

Time allocations based on EBW for 10 G ports can be defined as:

$$t_{i,10G,j}^{n}=(t_{10G}\times EBW_{i,10G,j})/\left(\sum_{i=1}^{S}EBW_{i,10G,j}\right)$$

The previous equations can be generalized as follows. If 1 G and 10 G traffic are in the same priority, then time allocations can be defined as follows. The total time allocated for a 1 G port can be defined as $t_{1G}=(T/[(N\times 1)+(K\times 10)])$. The total time allocated for 10 G port can be defined as $t_{10G}=((T\times 10)/[(N\times 1)+(K\times 10)])$. For example, the time allocation (e.g., the $n^{th}$ time slot, $t^n$) for the $i^{th}$ network flow in the $j^{th}$ network device (e.g., second device 206, optical network unit) can be defined as $t_{i,j}^{n}=(t\times EBW_{i,j})/(\Sigma_{i=1}^{M}EBW_{i,j})$.

Returning to FIG. 2, the first device 204 can comprise a prioritization unit 230 configured to control processing of data received via the network 202. For example, the prioritization unit 230 can comprise a buffer (e.g., queue). The buffer can receive data from the network 202. The buffer can store the data until the first device 204 is ready to process (e.g., transmit, send, route, forward, analyze) the data. For example, first device 204 can be configured to receive data asynchronously via the network 202. The first device 204 can be unaware of when data will be received via the network 202. The first device 204 can be configured to receive data via the network 202 without providing time slots (e.g., start time, end time), grant messages (e.g., specifying next time slot), and/or the like to remote devices (e.g., on the passive optical network). For example, one or more (or each) of the second devices 206 can be configured to transmit data to the first device 202 without receiving time slots (e.g., start time, end time), grant messages, and/or the like for data transmission. However, the first device 204 can be configured to allocate time allocation $t''$ (e.g., representing a length of the time in a given scheduling cycle T) for one or more second device 206 and/or one or more third device 208. The first device 204 can also keep track of usage of the time allocation for at least a portion (or each) of the one or more second device 206 and/or the one or more third device 208. For example, the first device 204 can record, store, track, and/or the like an amount of time to process (e.g., transmit, send, route, analyze) data for one or more of the second devices 206 and the third devices 208. The amount of time to process the data can be based on a processing factor, such as a transmission rate (e.g., rate of transmitting the data, from the first device via a network path, such as to an upstream device), a processing rate, and/or the like.

In an aspect, the prioritization unit 230 can be configured to prioritize processing of data based on the time cycle, an origin of the data (e.g., connection, source, flow, port), a priority of the data (e.g., connection priority, source priority, flow priority, channel priority). The prioritization unit 230 can determine (e.g., store, save, access) an amount of time used for processing data from a source during the time cycle. For example, each occurrence that data is processed from a particular source, the time used for processing such data can be stored. The time used for processing the data can be subtracted from the time allocation to determine a remainder of the time allocation. The time used for processing data can be added to a total time used for processing data during the time cycle. For example, when first data from a source is selected in the buffer for processing, the prioritization unit 230 can determine if the time allocation has been exceeded, will be exceed by processing the data, and/or the like. For example, the prioritization unit 230 can determine a first amount of time estimated for processing the data. If the remainder is less the first amount of time estimated for processing the data, then the prioritization unit 230 can delay processing of the first data until the time cycle ends (e.g., and a subsequent time cycle begins). As another example, the prioritization unit 230 can add the first amount of time estimated for processing the data to the amount of time used for processing data from the source during the time cycle. If this combination of time exceeds the time allocation, then the prioritization unit 230 can delay processing of the first data until the time cycle ends (e.g., and a subsequent time cycle begins).

In an aspect, the prioritization unit 230 can be configured to prioritize processing of data based on a prioritization algorithm. The prioritization algorithm can comprise a first-in-first-out prioritization, a round robin prioritization, and/or the like. For example, for a given time cycle, each processing slot can be served in a round robin fashion, starting with the highest priority source and continuing with the next highest priority source. For example, the prioritization unit 230 can service high priority data from multiple types of ports (e.g., switching back and forth between different ports of different bit rates).

As previously mentioned, the system 200 can comprise one or more second devices 206. For example, a second device 206 can be a termination point of the network 202. For example, the second device 206 can terminate a branch of the passive optical network. The second device 206 can be a gateway, a router, and/or the like. For example, the second device 206 can comprise an optical network unit (e.g., optical network terminal). The second device 206 can be an interface between the passive optical network and a local area network. The second device 206 can provide network access for a single user (e.g., customer) or provide network access to users in a geographic area (e.g., neighborhood, street).

In an aspect, the second device 206 can comprise one or more network flows 232. The one or more network flows 232 can comprise data (e.g., data packets, Ethernet frames) for transmission across the network 202. For example, the one or more network flows 232 can comprise a queue of data, a channel of data, and/or the like. The one or more network flows 232 can each have different priority, similar priority, same priority, and/or the like. The one or more network flows 232 can be associated with and/or receive data based on a device type (e.g., a mobile phone, a set top box, a television, a tablet, a laptop), a data type (e.g., video, audio, voice call, video call, text, images), a data priority (e.g., a high priority, a medium priority, a low priority), an application (e.g., a streaming application, a web browser, a chat program), a user (e.g., an administrator, a parent, a child, an owner, a customer), devices (e.g., user devices such as one or more of the plurality of third devices 208), a bit rate (e.g., 1 Gbps, 10 Gbps), and/or the like.

In an aspect, the second device 206 can comprise a transmission unit 234 configured to process data received by the second device 206. The transmission unit 234 can be configured to determine first data in a first network flow. The transmission unit 234 can be configured to determine a first time allocation associated with the first network flow. The second device 206 can be configured to determine how much data (e.g., how many frames, packets, and/or the like) can be sent within the time allocation (e.g., to avoid partial packet transmission). For example, the transmission unit 234 can be configured to determine whether processing the first data will (e.g., is expected to) result in exceeding the first time allocation. The transmission unit 234 can be configured to determine an expected time duration for the first device 206 to process the first data. The expected time duration can be determined based on the size of the first data (e.g., in addition to the CIR, the EIR, and/or the effective bandwidth). For example, a size of the first data (e.g., a data unit, a data packet, a data frame) can be determined. The size of the first data can be multiplied by a processing factor to determine the expected time duration. The processing factor can be based on a processing history (e.g., of the first device 204), device specifications (e.g., processor speed) of the first device 204, a predefined value, and/or the like. If processing the first data will result in exceeding the first time allocation, then the transmission unit 234 can delay sending the first data to the first device 204 until after a current time cycle is completed.

In an aspect, processing the data can comprise providing (e.g., sending, transmitting, routing, forwarding) the data to another device, such as a device upstream from the first device 204. Processing the data can comprise providing the data to a next hop in a network path. Processing the data can comprise providing the data to a destination device. For example, the amount of time to process the data can comprise an amount of time to provide (e.g., transmit, send) the data via a network path. The processing factor can comprise and/or be based on a bandwidth (e.g., available to the second device, on the network path), a transmission rate (e.g., of the first device 204, on the network path), and/or the like. For example, the transmission rate can comprise a rate of transmitting the data via the network path.

In an aspect, the second device 206 (e.g., or the third device 208) can be configured to avoid partial data (e.g., packet, frame) transmission. The first device 202, one or more of the second devices 206, and/or one or more of the third devices 208 can be configured to track usage of the time allocation associated with a corresponding source. For example, one or more of the second devices 206 can be configured to determine whether to transmit data (e.g., a packet, a frame) in a buffer of the second device 206 or not. Such a determination can be based on flow rate, data size (e.g., packet size, frame size), and/or the like. In another aspect, one or more of the second devices 206 may be configured to not track usage of a time allocation associated with the source. For example, the first device 204 can track usage of the time allocation of the source. After processing the data from one of the second devices 206, the first device 204 can determine to drop, discard, ignore, and/or the like data (e.g., packet, frame) from the source after a time allocation associated with the source of the data is used up (e.g., reduced below a threshold). The data can be retransmitted from the source to the first device (e.g., by upper layer protocols, such as transmission control protocol). For example, the first device 204 can be configured to send a message to one or more of the second devices 204 and/or the third devices 208 (e.g., source) indicating the loss of the data, requesting retransmission of the data, and/or the like.

In an aspect, an example third device 208 can be a user device. The third device 208 can be configured to provide content, services, information, applications, and/or the like to one or more users. For example, the third device 208 can comprise a computer, a smart device (e.g., smart phone, smart watch, smart glasses, smart apparel, smart accessory), a laptop, a tablet, a set top box, a display device (e.g., television, monitor), digital streaming device, proxy, gateway, transportation device (e.g., on board computer, navigation system, vehicle media center), sensor node, and/or the like.

In one aspect, the third device 208 can comprise an interface unit 236 configured to provide an interface to a user to interact with the third device 208 and/or remote devices, such as the first device 204. The interface unit 236 can be any interface for presenting and/or receiving information to/from the user, such as user feedback. An example interface can comprise a cloud consumer interface (e.g., interface of accessing data and applications remotely), a cloud provider interface (e.g., interface for controlling usage and delivery or content and data from a remote location to a user), a content viewer, such as a web browser (e.g., Internet Explorer®, Mozilla Firefox®, Google Chrome®, Safari®, or the like), a media player, an application (e.g., a web application, a mobile application, a media player application), and/or the like. Other software, hardware, and/or interfaces can be used to provide communication between the user and one or more of the third device 208 and the first device 204.

In an aspect, the third device 208 can comprise a communication unit 238. As an example, the communication unit 238 can request or query various files from a local source and/or a remote source. As a further example, the communication unit 238 can transmit to and/or receive data from a local or remote device such as the first device 204. The communication unit 238 can comprise hardware and/or software to facilitate communication. For example, the communication unit 238 can comprise one or more of a modem, a transceiver (e.g., a wireless transceiver), a digital-to-analog converter, an analog-to-digital converter, an encoder, a decoder, a modulator, a demodulator, a tuner (e.g., a QAM tuner, a QPSK tuner), and/or the like. In one aspect, the communication unit 238 can be configured to allow one or more remote devices (e.g., in a local or remote portion of the network 202) to control operation of the third device 208.

It should be noted that elements of the second device 206 and the third device 208 can be combined into a single device. For example, the third device 308 can be configured as a termination endpoint (e.g., an optical network unit). The second device 206 can comprise an interface unit 236, a communication unit 238, and/or the like.

FIG. 3 is a diagram illustrating example time allocations for multiple ports. For example, a computing device module 302, such as a line card is shown having a plurality of ports 304. The computing device module 302 can be located in, attached to, and/or otherwise coupled to a device, such as the first device 204 shown in FIG. 2. For example, the plurality of ports 304 can comprise a first set of ports 306 (e.g., 1-N ports) configured to receive and/or transmit data at a first bit rate. The plurality of ports 304 can comprise a second set of ports 308 (e.g., 1-K ports) configured to receive and/or transmit data at a second bit rate. The first bit rate can be different (e.g., lower, higher) than the second bit rate. As an illustration, the first bit rate can comprise 1 Gigabit per second (Gbps), and the second bit rate can comprise 10 Gbps. It should be noted that the plurality of ports 304 can be configured to receive and/or transmit data at any other appropriate bit rate, such as 40 Gbps, 100 Gbps, and/or the like.

In an aspect, a plurality information rates can be determined, as shown in FIG. 3. The information rates can be determined based on service level agreements associated with particular sources. The sources can comprise devices, network flows of devices, ports of devices, users, and/or the like. For example, M sources can be associated with the first set of ports 306. As another example, S sources can be associated with the second set of ports 308. Committed information rates can be determined (e.g., associated, assigned, allocated) for one or more (or each) of the M sources. Excess information rates can be determined for one or more (or each) of the M sources. Committed information rates can be determined for one or more (or each) of the S sources. Excess information rates can be determined for one or more (or each) of the S sources. One or more or each of the plurality of information rates can be used to determine time allocations of a time cycle. As an illustration, a time allocation (e.g., maximum time allowed for a source in a time cycle) can be allocated to a particular source based on the corresponding committed information rate and/or excess information rates.

Figure 4A:
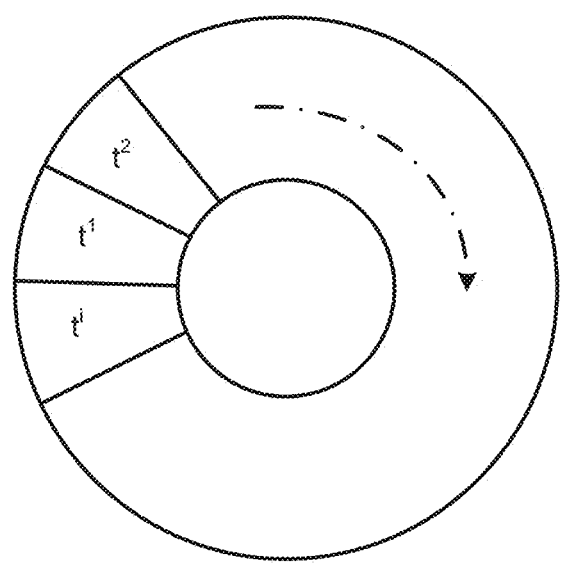
FIG. 4A is a diagram illustrating an example time cycle.

FIG. 4A is a diagram illustrating an example time cycle 400 for a single port. The time cycle 400 can be divided into a plurality of time allocations (e.g., $t^1$, $t^2$ ... $t^i$). The time allocations can be allocated based on committed information rates, excess information rates, effective bandwidth rates, and/or the like as described herein. For example, one or more (or each) of the time allocations can comprise a time duration representing a maximum amount of time for processing data from a corresponding source during the time cycle 400. A source can comprise any source of data for processing, such as a device, a network flow of a device, a port of a device, a user, and/or the like. The plurality of time allocations may not have associated (e.g., assigned) start time, end times, and/or the like. The source can be configured to use a time allocation without requesting approval (e.g. during the time cycle) for using the allocation during a time cycle. For example, the source can be configured to use a time allocation without requesting a start time for using the allocation. The plurality of time allocations can represent a maximum amount of time to process data during a given time cycle. One or more (or each) of the plurality of time allocations can be utilized all at once (e.g., at any time during the time cycle). One or more (or each) of the plurality of time allocations can be utilized incrementally (e.g., at various times through the time cycle).

Figure 4B:
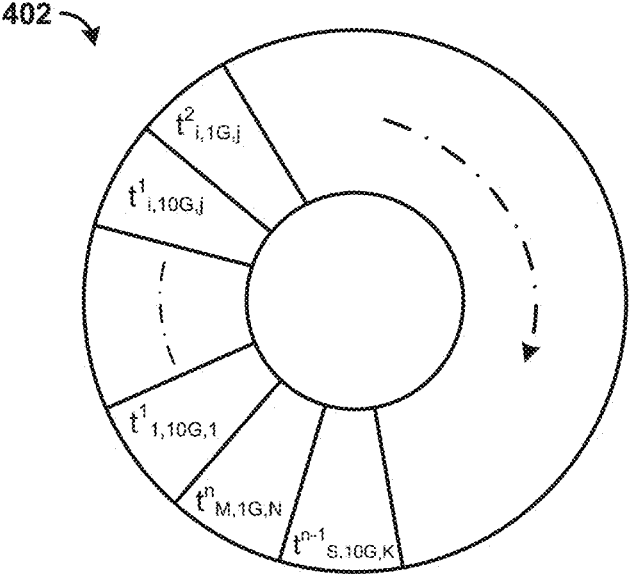
FIG. 4B is a diagram illustrating another example time cycle.

FIG. 4B is a diagram illustrating an example time cycle 402 for multiple communication channels. The communication channels can comprise a variety of communication channels configured to communicate at different bit rates. For example, a first communication channel can communicate at a first bit rate. A second communication channel can communicate at a second bit rate. As an illustration, a communication channel can be associated with a specific frequency, a port, a network link, and/or the like. The time cycle 402 can be divided into a first plurality of time allocations (e.g., $t^1_{1,1G,1} \ldots t''_{i,1G,j} \ldots t''_{M,1G,N}$) and a second plurality of time allocations (e.g., $t^2_{1,10G,1} \ldots t''_{i,10G,j} \ldots t''_{S,10G,K}$). The first plurality of time allocations can be time allocations (e.g., time durations) for a devices transmitting data via communication channels with a first bit rate. The second plurality of time allocations can comprise time allocations (e.g., durations) for devices transmitting data via communication channels with a second bit rate. For example, the first bit rate can comprise 1 Gbps and the second bit rate can comprise 10 Gbps. It should be appreciated that other bit rates can be used as appropriate. The time cycle 402 can comprise time allocations for both the first bit rate and the second bit rate.

The time allocations can be ordered and reserved or unordered and unreserved. For example, the time allocations can represent time durations (e.g., without a specific start or end time). The time durations can comprise a maximum amount of time for processing data from a particular source. The time allocations can relate to (e.g., be granted for) transmitting, processing, and/or the like of data at any time within the time cycle 402. As explained herein, the time cycle can be divided into time allocations, which can be assigned to (e.g., allocated to) corresponding sources. If the time cycle is a repeating time cycle, a source can use the corresponding time allocation each time the time cycle repeats. For example, a source can use a corresponding time allocation at a first portion (e.g., first time) of a first time cycle. The source can use the corresponding time allocation at a second portion (e.g., second time) of a second time cycle. The second time cycle can be subsequent to the first time cycle.

FIG. 5 is a flowchart illustrating an example method 500 for scheduling data transmissions. At step 502, data can be received from a first source. The data can comprise one or more data units, such as a data packet (e.g., an IP packet), a data frame (e.g., Ethernet frame), encapsulated data, a data block, a data segment, a data fragment, and/or the like. For the example, the data can be received at a first device (e.g., the first device 204 of FIG. 2). In an aspect, the first device can comprise a network device, such as a gateway, a router, a line terminal, and/or the like. For example, the first device can comprise a network device in an optical network, such as a passive optical network. For example, the first device can comprise an optical line terminal of a passive optical network. The first source can comprise an optical network unit of the passive optical network. For example, the data can be received into a buffer, such as a buffer of the optical line terminal. The first source can be configured to provide data to the first device without requesting a start time for providing the data. The first device can be configured to receive data from the first source without providing a start time, approval, and/or the like to the source.

The first time allocation can be allocated to the first source for accessing a shared network resource. The shared network resource can comprise bandwidth for a shared communication channel. The first time allocation can comprise a time duration representing a maximum amount of time for processing data from the first source during the time cycle.

In an aspect, the time cycle can comprise a second time allocation allocated for a second source. The first source and the second source can be network flows of a second device (e.g., the second device 206 and/or the third device 208 of FIG. 2). The time cycle can comprise first time allocations for data received via a first port of the first device and second time allocations for data received via a second port of the first device. The first port can be configured to receive data at a first bit rate. The second port can be configured to received data at second bit rate. The first bit rate can be different than the second bit rate.

At step 504, a time allocation of a time cycle can be determined (e.g., at the first device or an associated device such as a controller) in response to receiving the data from the first source. The time allocation can be allocated to the first source based on a committed information rate associated with the first source. The committed information rate can comprise a minimum bandwidth, a minimum bit rate, and/or the like associated with a source (e.g., by a service provider, based on an agreement of a user with the service provider). The committed information rate can also be based upon, in whole or in part, on minimum or maximum requirements (e.g., bandwidth, latency, data transmission rate) committed to a specific user, subscriber, or a device associated with a user or subscriber. In an aspect, the time allocation can also be allocated based on an excess information rate associated with the first source. The excess information rate can comprise a maximum bandwidth, a maximum bit rate, and/or the like associated with a source (e.g., by a service provider, based on an agreement of the user with the service provider). The time allocation can be allocated based on an effective bandwidth rate calculated based on the committed information rate and an excess information rate associated with the first source. The committed information rate, the excess information rate, the effective bandwidth rate, and/or the like can be specified in a service level agreement associated with the first source.

At step 506, the data can be processed (e.g., provided, transmitted, sent, routed, analyzed) in accordance with the time allocation. For example, processing the data in accordance with the time allocation can comprise determining a first amount of time that the first device has used for processing prior data received from the first source during the time cycle. The first amount of time can be indicative of (e.g., represent) how much of the time allocation the first device has already used in a given time cycle. A second amount of time can be determined by subtracting the first amount of time from the time allocation. The second amount of time can be indicative of (e.g., represent) how much of the time allocation remains for the first device to use during the time cycle. The data can be processed during the time cycle if the second amount of time is greater than a third amount of time estimated for processing the data. The third amount of time can be indicative of (e.g., represent) how much of the time allocation would be used by processing the data during the time cycle. For example, the third amount of time can be estimated based on a size of the data (e.g., a data unit, a data packet, a data frame). The size of the data can be multiplied by a processing factor to determine the expected time duration. The processing factor can be based on a processing history (e.g., of the first device), device specifications (e.g., a processor speed), a predefined value, a transmission rate, and/or the like.

In an aspect, processing the data can comprise providing (e.g., sending, transmitting, routing, forwarding) the data to another device, such as a device upstream from the first device. Processing the data can comprise providing the data to a next hop in a network path. Processing the data can comprise providing the data to a destination device. For example, the amount of time to process the data can comprise an amount of time to provide (e.g., transmit, send) the data via a network path. The processing factor can comprise and/or be based on a bandwidth (e.g., available to the first device, on the network path), a transmission rate (e.g., of the second device, on the network path), and/or the like. For example, the transmission rate can comprise a rate of transmitting the data via the network path.

FIG. 6 is a flowchart illustrating an example method 600 for scheduling data transmissions. At step 602, a plurality of data transmissions (e.g., transmitted data, data packets) can be received into a buffer from a network. In another aspect, rather than receiving entire data transmissions, representative information (e.g., size, bit rate, identification and routing information) related to the plurality of the data transmissions can be received. For example, the buffer can be a buffer of a first device (e.g., the first device 204 of FIG. 2). The data transmissions can be received into the buffer as one or more data units, such as a data packet (e.g., IP packet), a data frame (e.g., Ethernet frame), encapsulated data, a data block, a data segment, a data fragment, and/or the like. The buffer can store the data units at least temporarily until a condition is met, such as processing resources are available to process the data units, bandwidth is available for transmitting the data units, the data units are first in priority, and/or the like. The first device can comprise a network device, such as a router, a gateway, and/or the like. For example, the buffer can be implemented on an optical line terminal of an optical network. The optical network can comprise a passive optical network, such as an Ethernet passive optical network.

In an aspect, the buffer can be configured to receive data transmissions via a first port of the first device. The buffer can be configured to receive data transmissions via a second port of the first device. The first port can be configured to receive data transmissions at a first bit rate (e.g., 1 Gbps). The second port can be configured to receive data transmissions at a second bit rate (e.g., 10 Gbps). The first bit rate can be different than the second bit rate. The first time allocation can be granted to the first source based on which one of the first port and the second port the first source is configured to utilize for communication to the first device. For example, the first source can communicate via the first port, the second port, a combination thereof, and/or the like. The first source can comprise an optical network unit of the passive optical network.

At step 604, a first data transmission of the plurality of data transmissions in the buffer can be determined (e.g., identified, selected, received for processing). A first source of the first data transmission can also be determined (e.g., identified, selected, received for processing). For example, the first source can be a network flow of a second device (e.g., the second device 206 and/or the third device 208 of FIG. 2) comprising a plurality of network flows. In another aspect, the first source can comprise the second device (e.g., if the second device has a single network flow). The first source can be configured to provide the first data transmission to a device comprising the buffer (e.g., first device) without requesting a time slot for providing the first data transmission.

At step 606, it can be determined if processing (e.g., transmitting, providing, sending, routing, analyzing) the first data transmission will exceed a first time allocation of a time cycle. For example, process the first data transmission can comprise transmitting, sending, routing, providing, and/or the like the first data transmission via a network path. In an aspect, the first time allocation can be allocated to (e.g., associated with, assigned to) the first source for accessing a shared network resource. For example, the first time allocation can comprise a time duration representing a maximum amount of time for processing data transmissions from the first source during the time cycle.

The first time allocation can be associated with the first source based on an excess information rate associated with the first source. The excess information rate can comprise a maximum bandwidth, a maximum bit rate, and/or the like associated with the first source (e.g., by a service provider, based on an agreement of a user with the service provider). In an aspect, the first time allocation can also be allocated based on a committed information rate associated with the first source. The committed information rate can comprise a minimum bandwidth, a minimum bit rate, and/or the like associated with the first source (e.g., by a service provider, based on an agreement of the user with the service provider). The committed information rate can also be based upon, in whole or in part, on minimum or maximum requirements (e.g., bandwidth, latency, data transmission rate) committed to a specific user, subscriber, or a device associated with a user or subscriber. For example, the first time allocation can be allocated based on an effective bandwidth rate calculated based on the excess information rate and a committed information rate associated with the first source. The excess information rate, the committed information rate, he effective bandwidth rate, and/or the like can be specified in a service level agreement associated with the user associated with the source.

At step 608, the first data transmission can be processed (e.g., in a priority) based on the determination of whether the first data transmission will (e.g., is predicted to, estimated to) exceed the time allocation of the time cycle. Processing the first data transmission in a priority based on the determination of whether the first data transmission will exceed the time allocation of the time cycle can comprise determining a first amount of time used for processing prior data transmissions from the source during the time cycle. The first amount of time can be indicative of (e.g., represent) how much of the time allocation the second device has already used in a given time cycle. A second amount of time can be determined by subtracting the first amount of time from the first time allocation. The second amount of time can be indicative of (e.g., represent) how much of the time allocation remains for the second device to use during the time cycle. The first data transmission can be processed during the time cycle if the second amount of time is greater than a third amount of time estimated for processing the first data transmission. The third amount of time can be indicative of (e.g., represent) how much of the time allocation would be used by processing the data during the time cycle.

For example, the third amount of time can be estimated based on a size of the first data transmission (e.g., or received data unit, data packet, data frame). The size of the first data transmission can be multiplied by a processing factor to determine the expected time duration. The processing factor can be based on a processing history (e.g., of the first device), device specifications (e.g., processor speed), a predefined value, a transmission rate, and/or the like.

In an aspect, processing the first data transmission can comprise providing (e.g., sending, transmitting, routing, forwarding) the first data transmission to another device, such as a device upstream from the first device. Processing the first data transmission can comprise providing the first data transmission to a next hop in a network path. Processing the first data transmission can comprise providing the first data transmission to a destination device. For example, the amount of time to process the first data transmission can comprise an amount of time to provide (e.g., transmit, send) the first data transmission via a network path. The processing factor can comprise and/or be based on a bandwidth (e.g., available to the second device, on the network path), a transmission rate (e.g., of the second device, on the network path), and/or the like. For example, the transmission rate can comprise a rate of transmitting the data via the network path.

Figure 7:
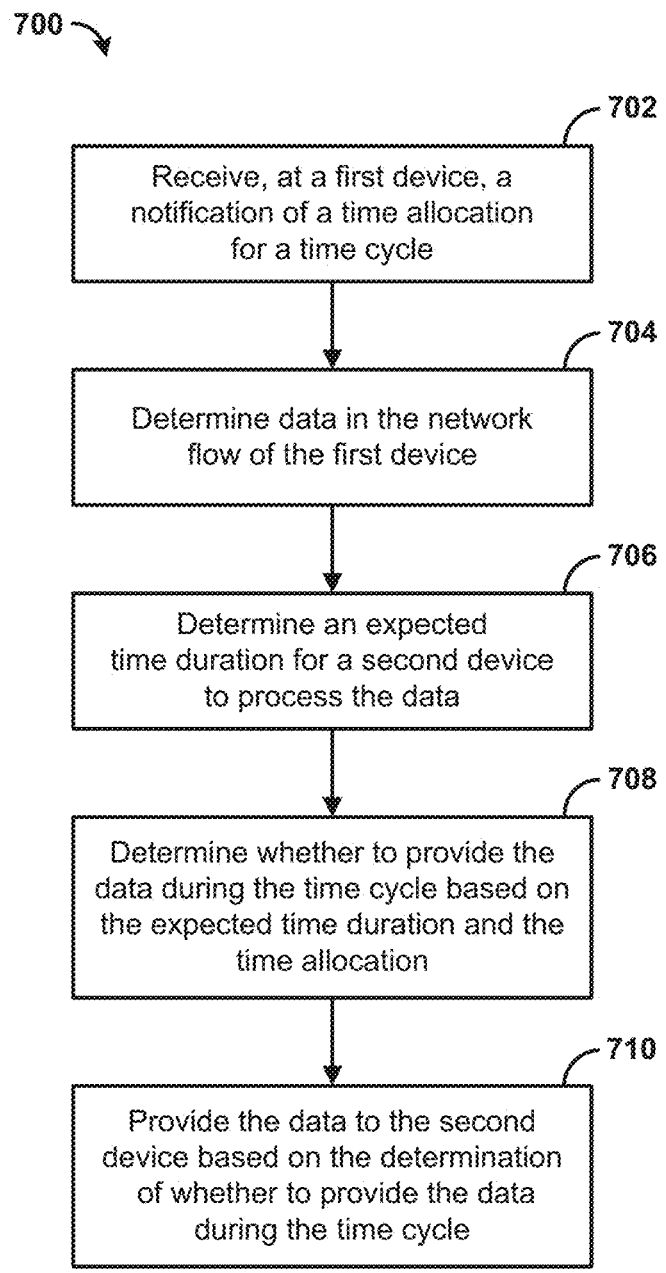
FIG. 7 is a flowchart illustrating yet another example method.

FIG. 7 is a flowchart illustrating an example method 700 for scheduling data transmissions. At step 702, a notification of a time allocation for a time cycle can be received. For example, the notification of the time allocation can be received at a first device (e.g., the second device 206 or the third device 208 of FIG. 2). The time allocation can be allocated for a network flow of the first device based on a service level (e.g., service level agreement) associated with the first device. For example, the notification can be received as a message, such as an Operation, Administration, and Maintenance (OAM) message. The notification can be received via an in-band channel, an out-of-band channel, and/or the like. The notification can be received via a layer 2 connection, an Internet Protocol (IP) connection, a multiprotocol label switching (MPLS) connection, and/or the like.

The first device can comprise a network device, such as a gateway, a router, and/or the like. For example, the first device can comprise an optical network unit of a passive optical network. The first device can comprise a plurality of network flows. The network flow can be one of the plurality of network flows. The first device can be configured to provide the data to the second device without requesting a time slot for providing the data. As an example, a network flow can comprise a data stream, a flow of a network connection, a data channel, a data queue, a data port, and/or the like. The data can comprise one or more data units, such as a data packet (e.g., IP packet), a data frame (e.g., Ethernet frame), encapsulated data, a data block, a data segment, a data fragment, and/or the like.

The time allocation can be allocated to the network flow for accessing a shared network resource. The time allocation can comprise a time duration representing a maximum amount of time for the second device to process data from the network flow during the time cycle. The time allocation can be allocated based on a committed information rate (e.g., of the service level agreement), an excess information rate (e.g., of the service level agreement), a combination thereof, and/or the like. The committed information rate can comprise a minimum bandwidth, a minimum bit rate, and/or the like associated with a source (e.g., by a service provider, based on the service level agreement of a user with the service provider). The committed information rate can also be based upon, in whole or in part, on minimum or maximum requirements (e.g., bandwidth, latency, data transmission rate) committed to a specific user, subscriber, or a device associated with a user or subscriber. The excess information rate can comprise a maximum bandwidth, a maximum bit rate, and/or the like associated with the source (e.g., by the service provider, based on an agreement of the user with the service provider). For example, the time allocation can be allocated based on an effective bandwidth rate. The effective bandwidth rate can be calculated based on an excess information rate of the service level agreement and a committed information rate of the service level agreement.

In an aspect, the notification of the time allocation for the time cycle can be received from a second device (e.g., the first device 204 of FIG. 2). The second device can comprise a network device, such as a gateway, a router, and/or the like. For example, the second device can comprise an optical line terminal of a passive optical network. The second device can be configured to receive data via a first port of the second device and a second port of the second device. The first port can be configured to receive data at first bit rate. The second port can be configured to receive data at a second bit rate. The first bit rate can be different than the second bit rate. The time allocation can be granted to the network flow based on which one of the first port and the second port the network flow is configured to utilize (e.g., use) for communication to the second device. In an aspect, the notification can be received after the first device is connected to the second device. The notification can be received after the second device authenticates the first device. For example, the first device can provide user credentials to the second device. The second device can authenticate the first device based on the user credentials. The second device can identify a service level agreement associated with the user credentials.

At step 704, data in the network flow of the first device can be determined (e.g., identified, selected, received for processing). For example, the network flow can be a construct (e.g., a queue, a buffer, a list, a data structure) for organizing the processing of the data and/or communication of the data to upstream and/or downstream devices. The data can comprise data received from another device, data received at the first device from a user and/or application on the first device, and/or the like. For example, the network flow can be for a particular data type (e.g., video data, telecommunication data). The data can be data of the particular data type. The network flow can be for a particular user and/or device. The data can comprise data from the user and/or device. The network flow can be for a particular application (e.g., on the first device). The data can comprise data from the application. The network flow can be for a particular data priority (e.g., on the first device). The data can comprise data having the data priority. The network flow can be for all communication from the first device. The data can comprise any type of data to be communicated from the first device.

In an aspect, the first device can access the network flow. The first device can select, determine, identify, and/or the like the data in the network flow. For example, the data can be first in priority in the network queue. The priority can be based on a variety of factors, such as a data priority level, data size, a time at which data entered the network flow, and/or the like. For example, priority can be based on application type, such as a voice application, a video application, a web application, a file transfer, and/or the like. As an illustration, data representing voice traffic can have higher priority than data representing a file transfer. In an aspect, the priority can be determined based on one or more priorities specified in the service level agreement.

At step 706, an expected time duration for a second device to process (e.g., transmit, send, route, forward, analyze) the data can be determined. For example, a size of the data (e.g., data unit, data packet, data frame) can be determined. The size of the data can be multiplied by a processing factor to determine the expected time duration. The processing factor can be based on a processing history (e.g., of the second device), device specifications (e.g., processor speed), a predefined value, and/or the like.

In an aspect, processing the data can comprise providing (e.g., sending, transmitting, routing, forwarding) the data to another device, such as a device upstream from the second device. Processing the data can comprise providing the data to a next hop in a network path. Processing the data can comprise providing the data to a destination device. For example, the amount of time to process the data can comprise an amount of time to provide (e.g., transmit, send) the data via a network path. The processing factor can comprise and/or be based on a bandwidth (e.g., available to the second device, on the network path), a transmission rate (e.g., of the second device, on the network path), and/or the like. For example, the transmission rate can comprise a rate of transmitting the data via the network path.

At step 708, it can be determined whether to provide the data during the time cycle based on the expected time duration and the time allocation. Determining whether to provide the data during the time cycle based on the time usage and the first time allocation can comprise determining a first amount of time used by the second device for processing prior data from the network flow during the time cycle. A second amount of time can be determined by subtracting the first amount of time from the time allocation. A determination can then be made to provide the data during the time cycle if the second amount of time is greater than the expected time duration.

At step 710, the data can be provided (e.g., transmit, sent) to the second device based on the determination of whether to provide the data during the time cycle. For example, if the first device determines to provide the data, then the data can be provided to the second device. If the first device determines not to provide the data during the time cycle, the first device can provide the data to the second device during a subsequent iteration of the time cycle, after a predetermined (e.g., or calculated) period of time, and/or the like.

Figure 8:
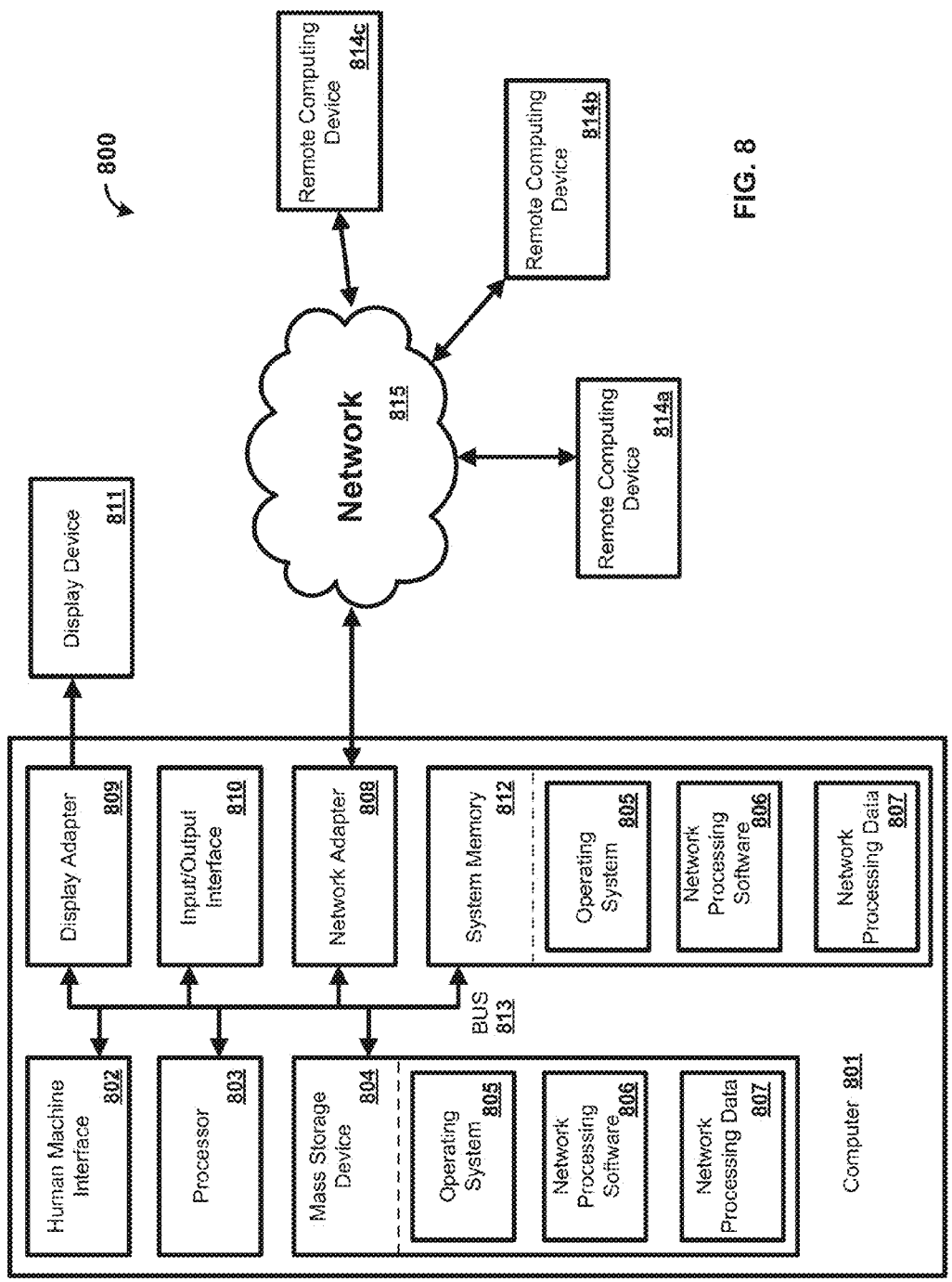
FIG. 8 is a block diagram illustrating an example computing device for performing aspects of the present methods and systems.

In an exemplary aspect, the methods and systems can be implemented on a computer 801 as illustrated in FIG. 8 and described below. By way of example, the network component 129 of FIG. 1 can be a computer as illustrated in FIG. 8. As another example, the first device 204, the second device 206, and/or the third device 208 of FIG. 2 can be computers as illustrated in FIG. 8. Similarly, the methods and systems disclosed can utilize one or more computers to perform one or more functions in one or more locations. FIG. 8 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well-known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computer 801. The components of the computer 801 can comprise, but are not limited to, one or more processors 803, a system memory 812, and a system bus 813 that couples various system components including the one or more processors 803 to the system memory 812. The system can utilize parallel computing.

The system bus 813 represents one or more of several possible types of bus structures, including a memory bus or memory controller, a peripheral bus, an accelerated graphics port, or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 813, and all buses specified in this description can also be implemented over a wired or wireless network connection and each of the subsystems, including the one or more processors 803, a mass storage device 804, an operating system 805, network processing software 806, network processing data 807, a network adapter 808, the system memory 812, an Input/Output Interface 810, a display adapter 809, a display device 811, and a human machine interface 802, can be contained within one or more remote computing devices 814a,b,c at physically separate locations, connected through buses of this form, in effect implementing a fully distributed system.

The computer 801 typically comprises a variety of computer readable media. Exemplary readable media can be any available media that is accessible by the computer 801 and comprises, for example and not meant to be limiting, both volatile and non-volatile media, removable and non-removable media. The system memory 812 comprises computer readable media in the form of volatile memory, such as random access memory (RAM), and/or non-volatile memory, such as read only memory (ROM). The system memory 812 typically contains data such as the network processing data 807 and/or program modules such as the operating system 805 and the network processing software 806 that are immediately accessible to and/or are presently operated on by the one or more processors 803.

In another aspect, the computer 801 can also comprise other removable/non-removable, volatile/non-volatile computer storage media. By way of example, FIG. 8 illustrates the mass storage device 804 which can provide non-volatile storage of computer code, computer readable instructions, data structures, program modules, and other data for the computer 801. For example and not meant to be limiting, the mass storage device 804 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 804, including by way of example, the operating system 805 and the network processing software 806. Each of the operating system 805 and the network processing software 806 (or some combination thereof) can comprise elements of the programming and the network processing software 806. The network processing data 807 can also be stored on the mass storage device 804. The network processing data 807 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computer 801 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the one or more processors 803 via the human machine interface 802 that is coupled to the system bus 813, but can be connected by other interface and bus structures, such as a parallel port, game port, an IEEE 1394 Port (also known as a Firewire port), a serial port, or a universal serial bus (USB).

In yet another aspect, the display device 811 can also be connected to the system bus 813 via an interface, such as the display adapter 809. It is contemplated that the computer 801 can have more than one display adapter 809 and the computer 801 can have more than one display device 811. For example, a display device can be a monitor, an LCD (Liquid Crystal Display), or a projector. In addition to the display device 811, other output peripheral devices can comprise components such as speakers (not shown) and a printer (not shown) which can be connected to the computer 801 via the Input/Output Interface 810. Any step and/or result of the methods can be output in any form to an output device. Such output can be any form of visual representation, including, but not limited to, textual, graphical, animation, audio, tactile, and the like. The display 811 and the computer 801 can be part of one device, or separate devices.

The computer 801 can operate in a networked environment using logical connections to one or more remote computing devices 814a,b,c. By way of example, a remote computing device can be a personal computer, portable computer, smartphone, a server, a router, a network computer, a peer device or other common network node, and so on. Logical connections between the computer 801 and a remote computing device 814a,b,c can be made via a network 815, such as a local area network (LAN) and/or a general wide area network (WAN). Such network connections can be through the network adapter 808. The network adapter 808 can be implemented in both wired and wireless environments. Such networking environments are conventional and commonplace in dwellings, offices, enterprise-wide computer networks, intranets, and the Internet.

For purposes of illustration, application programs and other executable program components such as the operating system 805 are illustrated herein as discrete blocks, although it is recognized that such programs and components reside at various times in different storage components of the computing device 801, and are executed by the one or more processors 803 of the computer. An implementation of the network processing software 806 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. Expert inference rules generated through a neural network or production rules from statistical learning).

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method, comprising:
   receiving, by a network device from a source, data;
   determining, based on receiving the data, a time allocation of a time cycle, wherein, based on a committed information rate, the time allocation is allocated to the source
   determining an amount of time used for processing prior data from the source during the time cycle;
   determining that a difference between the time allocation and the amount of time does not satisfy a threshold; and
   processing, based on determining that the difference does not satisfy the threshold and in accordance with the time allocation, the data.

2. The method of claim 1, wherein receiving the data comprises receiving the data without sending, to the source, a start time for sending the data.

3. The method of claim 1, wherein the first time allocation comprises a time duration represents a maximum amount of time for processing data from the source during the time cycle.

4. The method of claim 1, wherein the time cycle comprises another time allocation allocated for another source, and wherein the first source and the another source are network flows of another network device.

5. The method of claim 1, wherein the time cycle comprises one or more time allocations associated with data received via a first port associated with the network device and time allocations associated with data received via a second port associated with the network device, wherein the first port is associated with data at a first bit rate and the second port is associated with data at second bit rate, and wherein the first bit rate is different than the second bit rate.

6. The method of claim 1, wherein processing the data comprises sending the data to a device.

7. The method of claim 1, wherein the time allocation is allocated based on an effective bandwidth rate, wherein the effective bandwidth rate is calculated based on the committed information rate and an excess information rate associated with the source.

8. A method, comprising:
   receiving, by a network device, a plurality of data transmissions into a buffer;
   determining a first data transmission of the plurality of data transmissions and a source of the first data transmission;
   determining that processing the first data transmission will exceed a first time allocation of a time cycle, wherein, based on an excess information rate associated with the source, the time allocation is associated with the source;
   determining an amount of time used for processing prior data from the source during the time cycle;
   determining, based on a difference between the time allocation and the amount of time used for processing the prior data, a time window; and
   processing the first data transmission during the time cycle when the time window satisfies a threshold.

9. The method of claim 8, wherein the first time allocation comprises a time duration represents a maximum amount of time for processing data transmissions from the source during the time cycle.

10. The method of claim 8, wherein the first source is a network flow of another network device comprising a plurality of network flows.

11. The method of claim 8, wherein receiving the plurality of data transmissions into the buffer comprises receiving data transmissions via a first port and a second port, wherein the first port is associated with receiving data transmissions at a first bit rate and the second port is associated with receiving data transmissions at a second bit rate that is different than the first bit rate.

12. The method of claim 8, wherein the buffer is associated with an optical line terminal of a passive optical network, and the source comprises an optical network unit of the passive optical network.

13. The method of claim 8, wherein the first time allocation is allocated based on a committed information rate associated with the first source.

14. The method of claim 8, wherein the threshold is associated with an amount of time for processing the first data transmission, wherein processing the first data transmission comprises one or more of routing, forwarding, or transmitting the first data transmission to another network device.

15. A method, comprising:
   receiving, by a network device, a notification of a time allocation for a time cycle, wherein, based on a service level associated with the first device, the time allocation is allocated for a network flow of the network device;
   determining data in the network flow, and an amount of time used for processing prior data in the network flow during the time cycle;
   determining that a difference between the time allocation and the amount of time used for processing prior data satisfies a threshold;
   determining, based on the difference satisfying the threshold, an expected time duration for another network device to process the data; and
   sending, based on the expected time duration and the time allocation, the data to the another network device.

16. The method of claim 15, wherein the time allocation is allocated based on a committed information rate of the service level agreement, an excess information rate of the service level agreement, or a combination thereof.

17. The method of claim 15, wherein the time allocation comprises a time duration represents a maximum amount of time for the another network device to process data from the network flow during the time cycle.

18. The method of claim 15, wherein the network device comprises a plurality of network flows, and wherein the network flow is one of the plurality of network flows.

19. The method of claim 15, wherein the another network device comprises a first port and a second port, wherein the first port is associated with receiving data at a first bit rate and the second port is associated with receiving data at a second bit rate that is different than the first bit rate, and wherein the time allocation is granted to the network flow based on which one of the first port and the second port the network flow uses for communication to the another network device.

20. The method of claim 15, wherein the another network device comprises an optical line terminal of a passive optical network and the network device comprises an optical network unit of the passive optical network.

\* \* \* \* \*